US005483751A

United States Patent [19]
Kodato

[11] Patent Number: 5,483,751
[45] Date of Patent: Jan. 16, 1996

[54] CALIPER GAUGE

[75] Inventor: Toru Kodato, Utsunomiya, Japan

[73] Assignee: Mitutoyo Corporation, Tokyo, Japan

[21] Appl. No.: 114,696

[22] Filed: Aug. 31, 1993

[30] Foreign Application Priority Data

Aug. 31, 1992 [JP] Japan .................................. 4-231235
Aug. 31, 1992 [JP] Japan .................................. 4-231236

[51] Int. Cl.⁶ .................................................. G01B 5/14
[52] U.S. Cl. .................................................. 33/811; 33/794
[58] Field of Search ........................... 33/792, 794, 795, 33/796, 810, 811, 812, 813

[56] References Cited

U.S. PATENT DOCUMENTS

| | | | |
|---|---|---|---|
| 285,684 | 9/1883 | Sauter | 33/811 |
| 2,512,042 | 6/1950 | Stern | 33/812 |
| 2,770,046 | 11/1956 | Wichmann | 33/811 |
| 2,801,472 | 8/1957 | Davidiak et al. | 33/811 |
| 3,070,891 | 1/1963 | Neslund | 33/811 |
| 3,266,159 | 8/1966 | Scholl | 33/796 |
| 3,287,812 | 11/1966 | Smith | 33/796 |
| 3,835,544 | 9/1974 | Schneider | 33/795 |
| 4,062,120 | 12/1977 | Lacagnina | 33/819 |
| 4,106,204 | 8/1978 | Schäder | 33/795 |
| 4,420,887 | 12/1983 | Sakata et al. | 33/794 |

*Primary Examiner*—William A. Cuchlinski, Jr.
*Assistant Examiner*—G. Bradley Bennett
*Attorney, Agent, or Firm*—Flynn, Thiel, Boutell & Tanis

[57] ABSTRACT

A caliper gauge having a rotatably supported outer roller mounted on a slider, an inner roller rotatably located inside the outer roller to operationally slidingly contact with a main scale, and a ratchet system regulating a transmission of rotation from the outer roller to the inner roller, so that when the inner roller reaches a maximum rotation load, the ratchet system causes the outer roller to run independently in relation to the inner roller.

11 Claims, 4 Drawing Sheets ics_5,483,751

CALIPER GAUGE

BACKGROUND OF THE INVENTION

1. Field of the Invention

This invention is concerned with a caliper gauge defined by a main scale and a slider sliding by contacting the main scale.

2. Description of the Related Art

Several caliper gauges have previously been used, for example, a vernier type caliper gauge defined by a main scale having thereon a longitudinal graduation and a slider slidingly contacting the main scale and having thereon vernier graduation, a dial display type caliper gauge provided for displaying a measured length by converting a displacement value of a slider into a corresponding rotation of an indicator related to the slider, and a digital display type caliper gauge by converting a displacement value of a slider into an electrical signal by means of an encoder such as a photo-type, a capacitance-type or a magnetic-type encoder to indicate a measured length digitally on a digital display.

Using such conventional caliper gauge to measure an object, an operator generally keeps the object in one hand and holds the caliper gauge in the other hand to control a relative movement between the main scale and a corresponding slider with the thumb of the other hand urges and rotates a roller engageable with a main scale until a pair of inner jaws or outer jaws come into contact with a portion of the object to be measured. Accordingly, the objective length of the object can be known from a combination of the graduation on the main scale and the vernier graduation on the slider when using the vernier type caliper gauge, from the indicator when using the dial display type caliper gauge, or from the digital display when using the digital display type caliper gauge.

To move the slider contacting the main scale requires a bigger force than in instances involving a frictional resistance between the slider and the main scale. But, it is known from experience that a degree of the frictional resistance is changeable based upon the quality of the caliper gauge in a factory and upon the amount of deterioration over time. Furthermore, the operator is generally tending to move the slider quickly conduct a fast measure. Accordingly, there is a potential disadvantage such that the quick movement of the slider may damage the object to be measured when the jaws strike against the object.

Accordingly, when using the conventional caliper gauges, the operator is severely required to control the relative movement between the slider and the main scale to retain a measuring force. However, a sensitive and precise control through measurement by a person is rather difficult and causes a low working efficiency. Actually, the measuring force is unnecessarily big so as to strain the jaws and then cause a tolerance in the same under the Abbe principles. When the object is made of rubber, plastic or the like, errors because of a deformation of the object will be unavoidable.

As has been mentioned, any conventional caliper gauge should be held by one hand by its main scale to relatively move the slider in measurement, which causes the following disadvantages.

The main scale has a U-shaped section to move the slider, so that a holding of the main scale is not comfortable through measurement. More particularly, when the slider is close to the main scale for measurement, an area sufficient to hold the main scale is too limited.

Since the main scale is continuously held by hand, the main scale is then heated and may suffer therefrom. Especially in the digital display type caliper gauge, though electrodes are provided along the main scale there is a high probability that unacceptable damage will be done by heat.

Furthermore, in a factory, some operators will hold the caliper gauge by the main scale with a soiled hand. In this atmosphere, the graduation printed on the gauge will be too soiled to be read. When using the digital display type caliper gauge, if the operator's hand is soiled by chips, the electrodes provided in the caliper gauge will suffer therefrom.

An object of the present invention is to provide a caliper gauge which does not involve the above-mentioned disadvantages but can achieve a high working efficiency through measurement while retaining a comfortable measurement force in comfortable.

Another object of the present invention is to provide a caliper gauge which is comfortable in operation and reading the measured value with no suffering from the heat of the hand.

SUMMARY OF THE INVENTION

The present invention relates to a caliper gauge essentially consisting of a main scale having at least one jaw for measurement and a slider slidingly contacting with the main scale and having at least one jaw corresponding to the jaw provided on the main scale, the set of jaws contacting with a portion of an object to be measured, the caliper gauge having: an outer roller in a state rotatable and secured to the slider; an inner roller rotatably located inside the outer roller to operationally contact with the main scale; and a constant pressure means for regulating a transmission of rotation from the outer roller to the inner roller, so that the inner roller has an excess rotation load, the outer roller runs idle in relation to the inner roller.

The constant pressure means is preferably a ratchet system having a first ratchet wheel attached to the outer roller, a second ratchet wheel attached to the inner roller to mesh with the first ratchet wheel, and biasing means constantly urging the inner roller to the outer roller to mesh the second ratchet wheel with the corresponding first ratchet wheel. Incidentally, the inner roller should be formed to keep up against the side wall of the main scale. Furthermore, the biasing means can be a belleville spring. The mentioned inner roller can be formed into a bobbin shape having tapered portions between which the main scale is clamped. The inner roller is adapted to reciprocally move toward and away from the side wall of the main scale. The outer roller and the inner roller are supported by a set of arms fixed to the slider.

The caliper gauge according to the present invention further preferably has, separately from at least one jaw provided on the slider, a grip cover having thereon a portion to be gripped by hand and to receive therein the main scale. Incidentally, the grip cover is formed thereon with wave-shaped corrugated portions entirely. And the grip cover is preferably covered up.

In measurement, the caliper gauge can be operated by one hand as by touching and rotating the outer roller by the thumb to keep up against the main scale whereby the relative movement between the main scale and the slider is effected until the jaw contacts with the object to be measured. After this moment, the outer roller is adapted to run idle in relation to the inner roller to prevent unnecessary measuring force.

The caliper gauge according to the present invention can be operated in a state wherein the operator holds the grip cover prepared separately from the jaws of the slider to comfortably control the relative displacement between the main scale and the slider. Accordingly, the operator easily holds and carries out the measurement with this caliper gauge, even if there is not enough area to hold onto the main scale which required in the conventional gauge.

No touching of the main scale by the hand is effective to prevent unacceptable heat-up of the main scale, soiling the graduation printed on the scale, and damaging the electrodes provided in the main scale by chips soiling on the hand.

Figure 1:
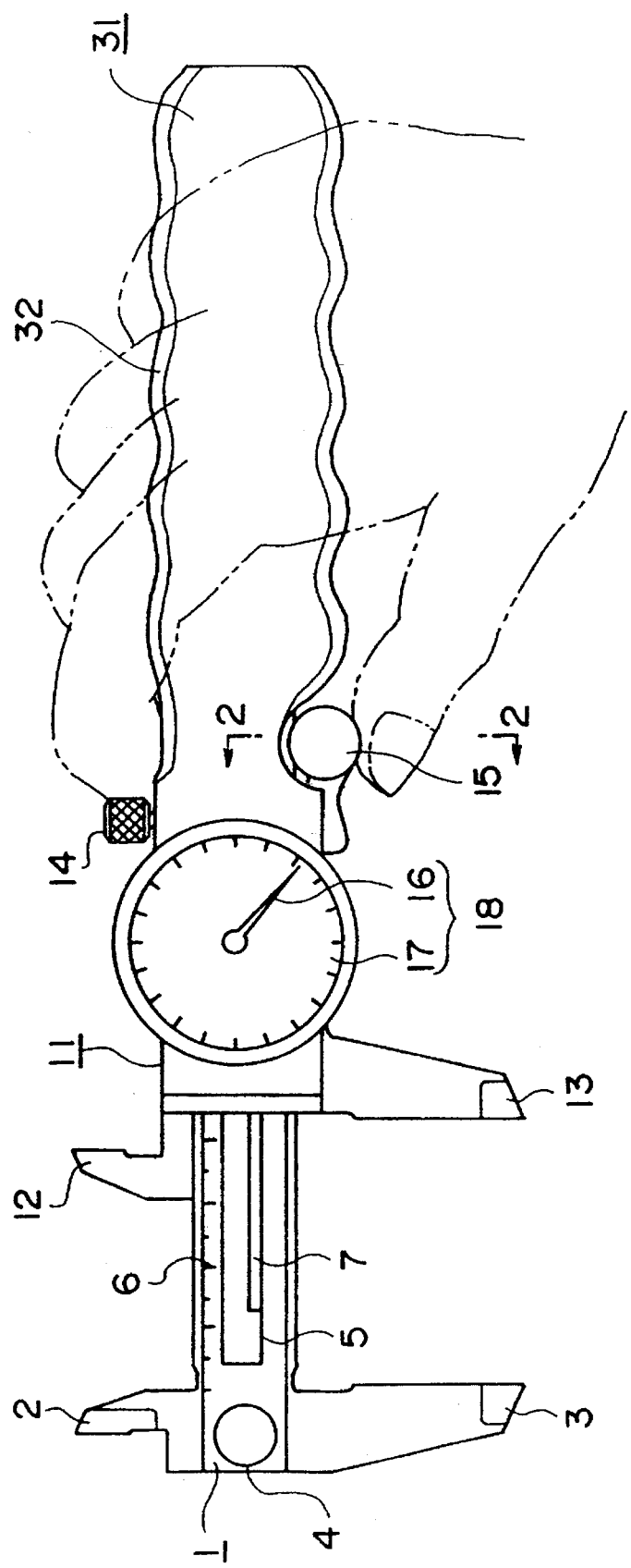
FIG. 1 is a front view depicting the appearance of the overall composition of a caliper gauge in the most preferable embodiment according to the present invention.

Certain terminology will be used in the following description for convenience in reference only and will not be limiting. The words "up", "down", "right" and "left" will designate directions in the drawings to which reference is made. The words "in" and "out" will refer to directions toward and away from, respectively, the geometric center of the device and designated parts thereof. Such terminology will include derivatives and words of similar import.

DETAILED DESCRIPTION OF THE PREFERRED EMBODIMENT(S)

These and other objects of the present invention will become more fully apparent with reference to the following specification and drawings which relate to several preferred embodiments of the present invention.

FIG. 1 is a front view of a caliper gauge according to the present invention. The caliper gauge depicted in FIG. 1 is defined by a main scale 1, a slider 11 capable of sliding contact with the main scale 1, and a sectionally square-shaped grip cover 31 made from a synthetic resin and being secured to the slider 11.

To a forward end or left end of the main scale 1 in FIG. 1 are fixed an inward jaw 2 and an outward jaw 3 facing in opposite directions. The main scale 1 is further provided between the jaws 2 and 3 at the forward end, with a hole 4 for facilitating an easy drawing of the main scale 1 out from the slider 11. On a front surface of the main scale 1, there are provided parallel graduations to a scale 6 and a lengthwise extending guide groove 5 in which a lengthwise extending rack 7 is fixedly provided.

The slider 11 has at its forward end or left end an inward jaw 12 and an outward jaw 13 which correspond to the inward jaw 2 and the outward jaw 3 fixed to the main scale 1, and is also provided with a clamp screw 14 and a press roller system 15 for temporarily or intentionally interrupting a relative movement between the slider 11 and the main scale 1. A pair of inward jaws 2 and 12 and a pair of outward jaws 3 and 13 are adapted to comfortably come into contact with a portion to be measured as done by the conventional caliper gauges. Between the jaws 12, 13 and the clamp screw 14 or the press roller system 15 on the front surface of the slider 11 is provided a dial indicating device 18 for displaying a distance between the inward jaws 2 and 12 or the outward jaws 3 and 13. The dial indicating device 18 is defined by an indicator 16 coupled with a pinion (not-shown) meshing with the rack 5 and a dial plate 17.

Figure 2:
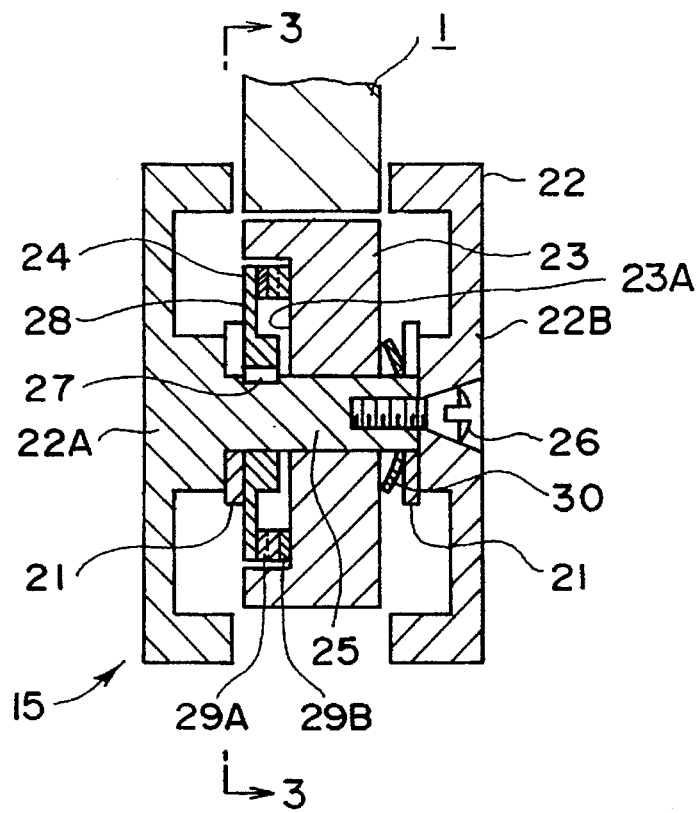
FIG. 2 is a sectional view taken along the 2—2 line in FIG. 1.
Figure 3:
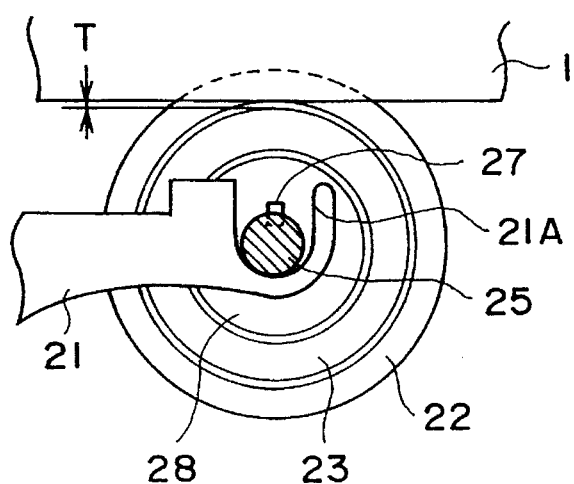
FIG. 3 is a sectional view taken along the 3—3 line in FIG. 2.
Figure 4:
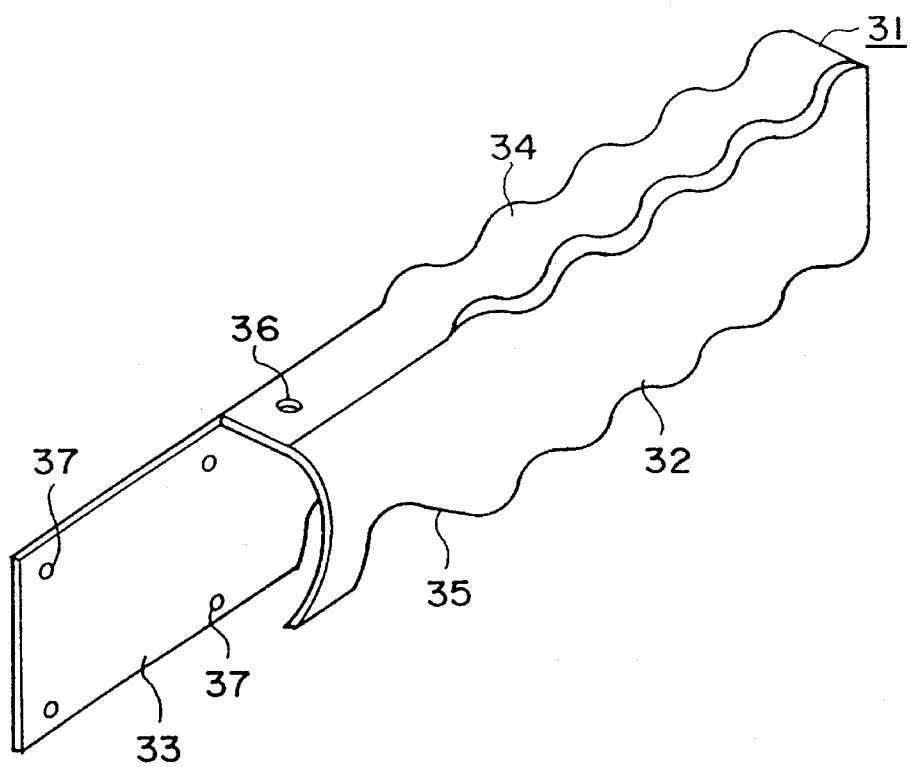
FIG. 4 is a perspective view depicting a grip cover used in the preferable embodiment.

The press roller system 15 comprises, as depicted in FIGS. 2 and 3, an outer roller 22 rotatably supported by a pair of arms 21 at the forward end of the slider 11, an inner roller 23 rotatably located inside the outer roller 22 and adjacent to a side surface of the main scale 1 at certain intervals T therebetween, and a ratchet system 24 as a constant pressure means provided between the inner roller 23 and the outer roller 22 to transmit a rotation of the outer roller 22 to the inner roller 23. Incidentally, if the inner roller 23 has an excess rotation load, the outer roller 22 runs idle in relation to the inner roller 23 to regulate the rotational power therefrom to the inner roller 23.

The arms 21 each have a U-shaped cut bearing portion 21A to support the press roller system 15. The outer roller 22 comprises one outer roller half-member 22A located at a front side of the caliper gauge and having an axle 25 which is projected therefrom to be supported at the U-shaped cut bearing portions 21A of the pair of the arms 21 and the other outer roller half-member 22B fixed to the axle 25 of the outer roller half-member 22A by a screw 26. The inner roller 23 is rotatably coupled on the axle 25 of the outer roller half-member 22A and has a recess 23A on its side surface opposing the outer roller half-member 22A.

The ratchet system 24 comprises, in the recess 23A, a disk 28 secured on the axle 25 by a key 27, first and second ratchet wheels 29A, 29B oriented between the disk 28 and the inner roller 23 to mesh to each other, and a belleville spring 30 as a biasing means to make the first and second ratchet wheels 29A and 29B mesh to each other via sectionally triangle-shaped teeth provided thereon respectively.

Figure 5:
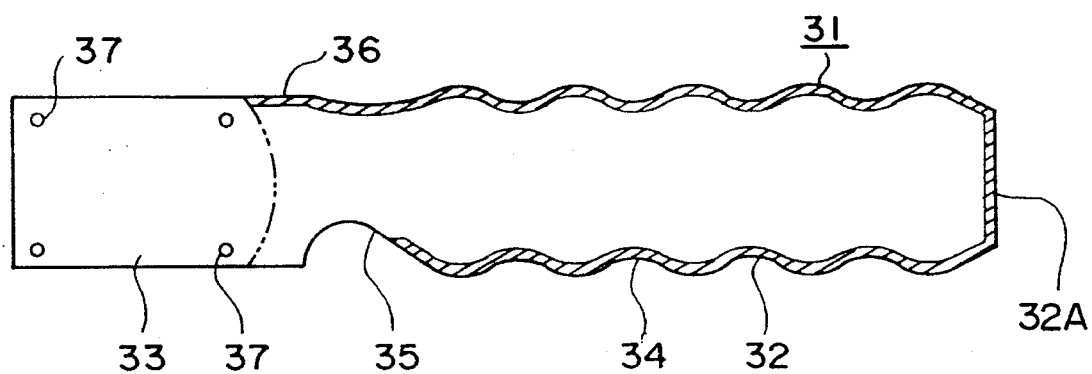
FIG. 5 is a sectional view of the grip cover.

The grip cover 31 is defined by a sectionally square-shaped grip portion 32 having a enough inner space therein for receiving the main scale 1 entirely even when the slider 11 is very close to the main scale 1, and by a base 33 extended from a forward end of the grip portion 32 and being adapted to be attached to the rear of the slider 11 by screws (not shown). The grip portion 32 has at its both upper and lower side surfaces longitudinally extending wave-shaped corrugated portions 34, a notch portion 35 receiving the press roller system 15 in an exposing state, and a hole 36 on the upper surface thereof to receive thereinto the clamp screw 14. Incidentally, a bottom or right end 32A (in FIG. 5) of the grip portion 32 is covered and the base 33 is provided with four holes 37 at its corners to receive therethrough the screws.

As can be understood from the above mentioned description, when assembling the caliper gauge of the present invention, the main scale 1 accompanied with the slider 11 is inserted into the grip portion 32 until the rear surface of the slider 11 contacts with the base 33 and then the slider 11 is fixed in relation to the grip cover 31 through the base by the screws inserted through the holes 37. The clamp screw 14 is thereafter threadedly secured into the slider 11 through the hole 36 to complete the whole assembly of the caliper gauge.

When using the above-mentioned caliper gauge for measurement, the caliper gauge can be preferably carried by one hand (the right hand in general) of an operator as depicted in FIG. 1 in a state that the thumb lightly touches the outer roller 22 of the press roller system 15 on a degree to leave from its seated position at the bottom of the U-shaped cut bearing portions 21A so that the inner roller contacts with the lower surface of the main scale 1 at the peripheral surface thereof. In this state, rotating the outer roller 22 by the thumb, its rotation is securely transferred to the inner roller 23 through the ratchet system 24 to thereby shift the main scale 1 relatively to the slider 11 upon the rotation degree of the inner roller 23.

Figure 6:
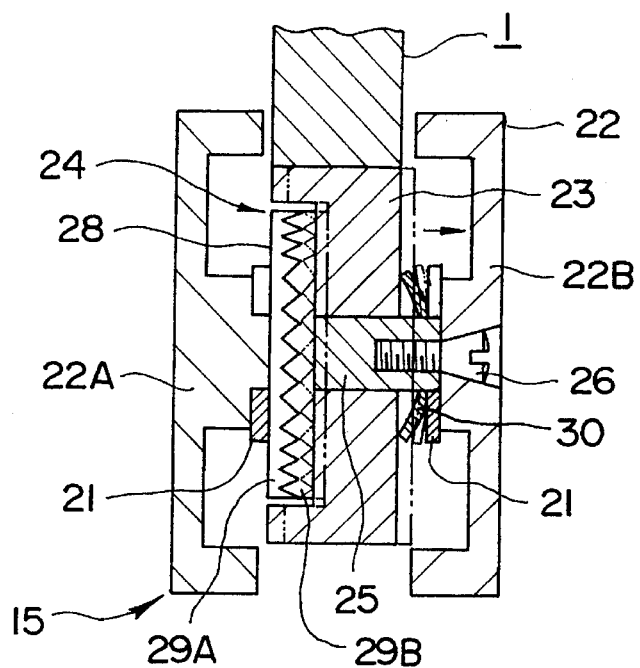
FIG. 6 is a explanatory sectional view taken along the 2—2 line in FIG. 1 for assisting an explanation of a press roller system operation.

Through the relatively longitudinal movement between the slider 11 and the main scale 1, the rotation of the not-shown pinion meshing with the rack 7 of the main scale 1 is directly transmitted to the indicator 16, so that the distance between the pair of jaws 1 and 12 or 3 and 13 can be read out by the operator seeing the value designated by the indicator 16 on the dial plate 17. But, when the jaws 2, 12, 3, 13 contact with a portion of the object to be measured through such relative movement, the relative movement will be no longer continued naturally. At this moment, as the inner roller 23 can not rotate any more since contacting with the lower surface of the main scale 1, the second ratchet wheel 29B is released from the intermeshing connection with the first ratchet wheel 29A against the urging force by the belleville spring 30 thus to make the first ratchet wheel 29A run idle in relation to the second ratchet wheel 29B as depicted in FIG. 6. More specifically, the sectionally triangle-shaped teeth provided on the first and second ratchet wheels 29A and 29B generally meshing to each other are allowed to slidingly contact with each other, whereby the outer roller 22 runs idle in relation to the inner roller 23. The value designated by the indicator 16 on the dial plate 17 now means an actual distance between the pair of jaws 2 and 12 or 3 and 13, that is, a real length of the portion to be measured.

As the slider 11 should be shifted in an opposite direction before starting the measurement procedure, the thumb of the right hand does not touch the outer roller 22 of the press roller system 15. In this state, the inner roller 23 separates from the lower surface of the main scale 1 due to the righting moment of the arms 21 at a distance T, so that the relative movement of the slider 11 and the main scale 1 can be done very smoothly without an activation of the ratchet system 24.

As has been discussed, the caliper gauge according to the present invention has the slider 11 provided with the rotatable outer roller 22 associated therein with the inner roller 23 capable of contacting with the main scale 1 and the rotation power transmitting system from the outer roller 22 to the inner roller 23 is so controlled that when the inner roller 23 has an excess rotation load, the rotation of the outer roller 22 no longer affect the inner roller 23 by means of the characteristic constant pressure means, so that the measuring efficiency will be fine and an unacceptable measuring force is not put to the portion to be measured so as to not deform or damage the same.

The above-mentioned constant pressure means is provided as the ratchet system 24 having the first ratchet wheel 29A attached to the outer roller 22, the second ratchet wheel 29B attached to the inner roller 23 to mesh with the first ratchet wheel 29A, and the belleville spring 30 constantly urging the inner roller 23 to the outer roller 22 to mesh the second ratchet wheel 29B with the corresponding first ratchet wheel 29A, so that the outer roller 22 can run idle in relation to the inner roller 23 when the inner roller 22 has the excess load.

Since the first ratchet wheel 29A can be prepared separately from the outer roller 22 and secured to the disk 28, the assembly and the preparation of such parts can be simplified.

The relative movement between the main scale 1 and the slider 11 is smoothly carried out, since the ratchet system 24 dose not cause friction therebetween as long as the operator does not touch the outer roller 22 when measurement is occurring.

The engagement between the main scale 1 and the slider 11 can be carried out reliably since the outer roller 22 and the inner roller 23 of the constant pressure means are supported by the arms 21 which are secured to the slider 11.

The contact surface of the inner roller 23 to the lower surface of the main scale 1 is enough to transmit the rotation of the outer roller 22 into the movement of the main scale 1.

Since the grip cover 31 to hold the caliper gauge is provided separately from the jaws 12, 13, the operator always carries the caliper gauge through the measurement with one hand and makes a relative movement between the slider 11 and the main scale 1, so that the operator will not be hindered by the lack of a portion to hold the gauge as in the conventional caliper gauge.

The grip cover 31 has the grip portion 32 provided with the entire wave-shaped corrugate portions 34 to be held by one hand easily, so that the operator does not need to care about carrying the gauge with the hand soiled with oil. Furthermore, such soiled hand does not touch the main scale 1 and so on through the measurement, so that the caliper gauge does not become influenced by an unacceptable amount of heat from the hand and will not be soiled.

Since the grip portion 32 is covered up, any dust and oil will not invade into the grip cover 31.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

For example, as another constant pressure means, the ratchet system 24 can be replaced with a similar system wherein there are no ratchet wheels such as the members 29A and 29B in the above-mentioned embodiment and wherein the disk 28 contacts with the inner roller 23 directly by means of the belleville spring 30.

Figure 7:
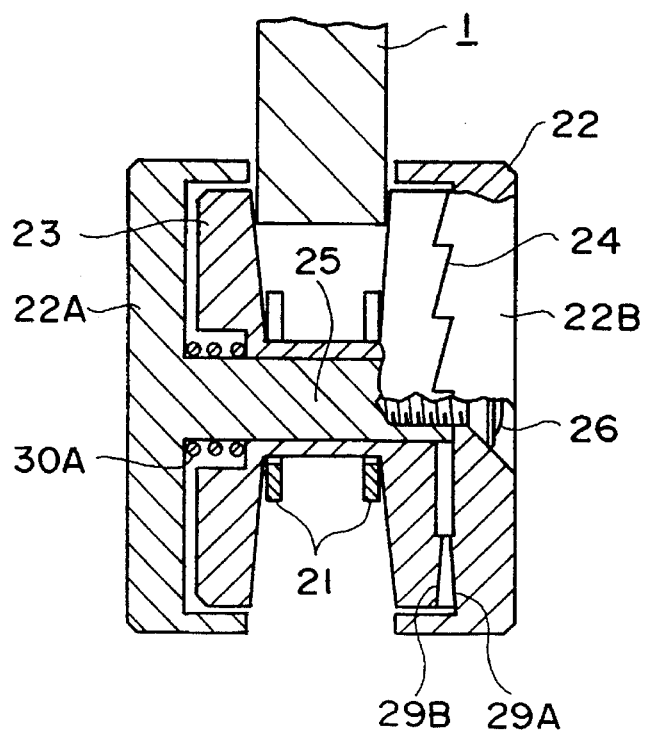
FIG. 7 is a modification of the press roller system.

FIG. 7 depicts another modification of the press roller system 15, wherein the inner roller 23 is formed into a bobbin shape having a pair of tapered portions such that when the outer roller 22 is operated by the thumb, the main scale 1 is clamped between the tapered portions. Incidentally, there is provided a coil spring 30A coupled on the axle 25 of the outer roller half-member 22A, so that the ratchet wheel 29B of the inner roller 23 and the ratchet wheel 29A of the outer roller half-member 22B are meshingly connected to each other.

The grip cover 31 covering up the main scale 1 is not always necessary for carrying the caliper gauge. The grip cover 31 is not to be limited to the mentioned shape and structure. More specifically, the length of the grip cover 31, which had enough length to receive therein the main scale 1 entirely, could be a shorter one as the operator can carry the caliper gauge by hand.

The bottom or right end 32A (in FIG. 5) of the grip cover 31 could be opened.

The grip cover 31 could be made from other materials showing enough strength when held by hand as a substitute for the synthetic resin used in the aforementioned embodiment.

The wave-shaped corrugate portions 34 formed on the grip cover 31 could be knurled portions to prevent the unacceptable slippery state.

The above mentioned embodiment referred to the dial display type caliper gauge. However, the present invention can be naturally applied into other caliper gauges such as a vernier type caliper gauge and a digital display type caliper gauge. Applied into the vernier type caliper gauge, even if operated by a soiled hand, the measured value may be read easily since it will not be obscured. And applied into the digital display type caliper gauge, even when the hand of the operator is soiled by chips, electrodes provided in the caliper gauge will not hinder its operation.

Accordingly, since the caliper gauge according to the present invention has the slider provided with the rotatable outer roller associated therein with the inner roller capable of contacting with the main scale and the rotation power transmitting system from the outer roller to the inner roller is so controlled that when the inner roller has an excess rotation load, the rotation of the outer roller no longer affect the inner roller by means of the characteristic constant pressure means, so that the measuring efficiency will be fine and an unacceptable measuring force is not put to the portion to be measured so as to not deform or damage the same.

Furthermore, the grip cover for holding the caliper gauge is provided separately from the jaws so that the caliper gauge will not be influenced by an unacceptable amount of heat from the hand and will not be soiled.

What is claimed is:

1. A caliper gauge comprising:

a main scale having at least a first jaw;

a slider including first support means for slidingly supporting said main scale for movement relative to said slider and having thereon at least a second jaw corresponding to said first jaw provided on said main scale, a set defined by said first and second jaws being adapted to operatively contact a portion of an object to be measured;

an outer roller rotatably mounted on said slider;

an inner roller and second support means for rotatably supporting said inner roller and for operative contact with said main scale; and yieldable torque transmitting means interconnecting said outer roller to said inner roller and for regulating a maximum level of torque transmission from said outer roller to said inner roller, so that upon a manual driving of said outer roller for rotation, said inner roller will be driven for rotation through said yieldable torque transmission means, said inner roller, caused by said contact with said main scale, thereby effecting a relative movement between said slider and said main scale until an engagement of the set of jaws with the object to thereby cause a halting of said relative movement, a continued manual driving of said outer roller in a direction to tighten the engagement of the set of jaws with the object being ineffectual to cause rotation of said inner roller and relative movement between said slider and main scale because of a yielding of said yieldable torque transmitting means to thereby mean that said outer roller runs idle in relation to said inner roller.

2. The caliper gauge according to claim 1, wherein said yieldable torque transmitting means is a ratchet system having a first ratchet wheel attached to said outer roller, a second ratchet wheel attached to said inner roller, teeth on said first and second ratchet wheels which are yieldably meshed with one another, and biasing means constantly urging teeth on said inner roller into yieldable meshing engagement with teeth on said outer roller.

3. The caliper gauge according to claim 2, wherein said biasing means is a belleville spring.

4. The caliper gauge according to claim 2, wherein said inner roller is formed into a bobbin shape having tapered portions between which said main scale is clamped.

5. The caliper gauge according to claim 2, wherein said first ratchet wheel is secured to said outer roller via a disk oriented in a coaxial relationship with said outer roller, and wherein the second ratchet wheel is directly secured to said inner roller.

6. The caliper gauge according to claim 2, wherein said inner roller has a peripheral surface adapted to contact with a side portion of said main scale.

7. The caliper gauge according to claim 1, wherein said outer roller and said inner roller are supported by a set of arms fixed to said slider.

8. The caliper gauge according to claim 7, wherein said inner roller is adapted to reciprocally move toward and away from a side portion of said main scale.

9. The caliper gauge according to claim 1, further comprising a grip cover having thereon a portion to be gripped by hand and to receive therein said main scale.

10. The caliper gauge according to claim 9, wherein said grip cover has formed thereon a wave-shaped corrugated portion.

11. The caliper gauge according to claim 9, wherein said grip cover covers up a majority of said slider.

* * * * *